Feb. 27, 1940.  H. W. KOST  2,192,087
FASTENER
Filed May 23, 1939
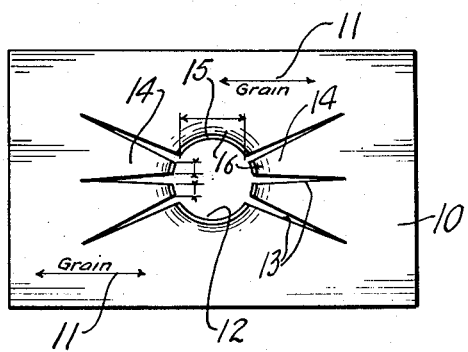
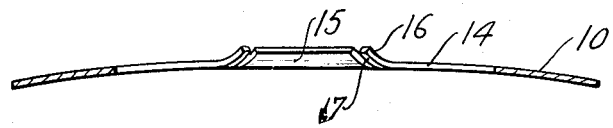
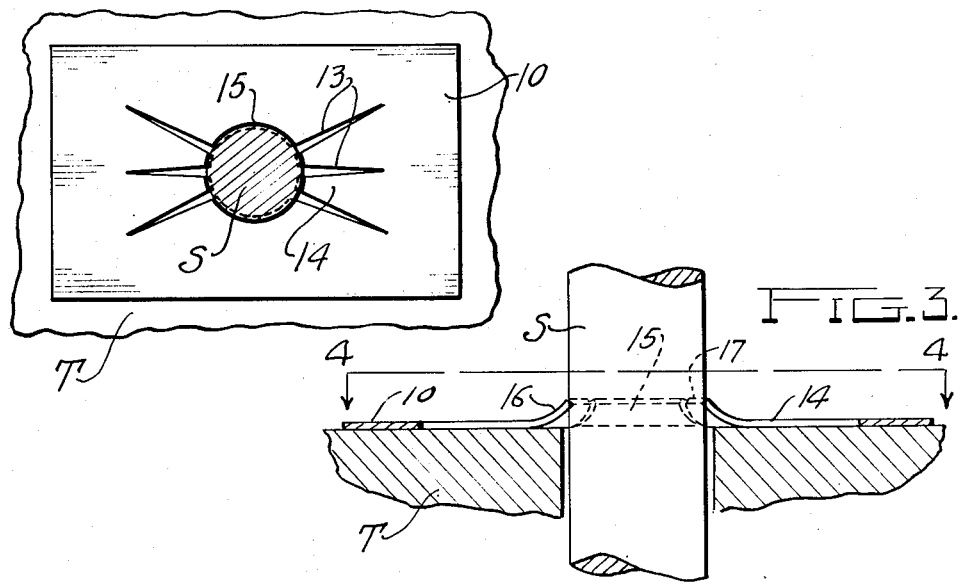
Inventor
Harold W. Kost
By Malcolm W. Fraser
Attorney Patented Feb. 27, 1940

2,192,087

UNITED STATES PATENT OFFICE 2,192,087

FASTENER

Harold W. Kost, Birmingham, Mich., assignor to Detroit Harvester Company, Detroit, Mich., a corporation of Michigan Application May 23, 1939, Serial No. 275,245

3 Claims. (Cl. 85—36)

This invention relates to fasteners, but more particularly to spring nuts of the type which are forced over a stud or the like, and grip the perimeter thereof for resisting removal or retrograde movement.

An object is to produce a simple and inexpensive fastener of the above character which has increased gripping power, is sturdy and reliable, and can be readily and conveniently applied, even in blind locations.

Another object is to produce a spring nut which has the new and improved features of construction and arrangement hereinafter described, and for purposes of illustration but not of limitation, an embodiment of the invention is shown on the accompanying drawing, in which:

Figure 1 is a top plan view of the fastener;

Figure 2 is a longitudinal sectional view of the fastener shown in Figure 1;

Figure 3 is a sectional view showing a fastener applied to a stud and abutting a support; and Figure 4 is a sectional view on the line 4—4 of Figure 3.

The illustrated embodiment of the invention comprises a fastener in the form of a rectangular, slightly cambered plate or piece 10 of relatively thin spring metal, although, according to the invention, the fastener may be formed in a panel or in strip form. For many purposes, however, a separate small metal piece is desirable, particularly where the metal of the panel does not have the spring characteristics or where the formation of the fastener is not economical.

In this instance it will be observed that the grain of the metal extends longitudinally of the piece, or in the direction of the arrows 11. Formed centrally of the piece 10 is an annular opening 12, and, radiating from the edge of the opening 12 are six slits 13, three being disposed on one side and three in diametrically opposed relation. It should be noted that the slits 13 of each pair extend in a direction longitudinally disposed relative to the piece 10, or generally in the direction of the grain of the metal. The intermediate slits of each pair are substantially parallel with the grain, whereas the other slits are inclined slightly but extend generally with the grain. Experience has shown that arrangement of the slits in this manner is most advantageous from the standpoint of manufacture and extended service.

The slits 13 form tongues 14, four in number, two on one side and two in opposed relation. As shown, these tongues are relatively narrow at their free ends and taper outwardly toward their opposite ends. Thus, each of the tongues 14 is quite flexible so that when the fastener is applied to a stud S (Figure 3), the tongues 14 readily flex to facilitate engagement.

Intermediate the pairs of tongues 14 are relatively rigid stud-engaging portions 15, which have combined stud-engaging surfaces which are several times greater than the combined stud-engaging surfaces of the tongues 14. Consequently, it will be evident that the relatively rigid surfaces 15 militate against disengagement between the stud S and fastener since these surfaces are obviously not so flexible, but, on the contrary, tenaciously grip the surface of the stud, thereby effectively resisting retrograde movement.

It will be understood that the diameter of the hole 12 is slightly less than the diameter of the stud S to which it is applied so that upon application of the fastener the tongues 14 flex slightly. After the fastener has been forced against the support T (Figure 3), it is flattened, thereby forcing the tongues 14 as well as the surfaces 15 into more intimate gripping engagement with the stud S. A lever-like action takes place somewhat constricting the opening 12, and, in this connection it will be evident that the positioning of the tongues 14 longitudinally of the camber is of importance.

The free ends of the tongues 14, as well as the relatively rigid surfaces 15, are upturned, as indicated at 16, adjacent the extreme ends. The remainder of these parts normally lie in the plane of the piece 10. These upturned end portions, which bound the hole 12, not only provide relatively sharp edge portions 17 which bite into the surface of the stud, but also facilitate in centering the fastener upon the end of the stud. This is particularly useful in blind locations, where the end of the stud cannot be seen, but even in other locations, this feature is exceedingly helpful in facilitating the application of the fastener.

This application constitutes a continuation in part of application Serial No. 245,578, entitled "Fastener."

Numerous changes in details of construction, arrangement and choice of materials may be effected without departing from the spirit of the invention, especially as defined in the appended claims.

What I claim is:

1. A fastener comprising a relatively thin plate of sheet material having an opening therein, a pair of diametrically opposed sets of relatively flexible juxtaposed tongues with the free ends thereof bounding said opening, relatively rigid plate portions disposed on opposite sides of each set of tongues and having a combined surface bounding said aperture greater than the combined bounding surface of said tongues, outwardly inclined portions adjacent the extreme free ends of said tongues, the remainder of said tongues normally lying substantially in the plane of said plate, and outwardly inclined portions on each of said relatively rigid plate portions cooperating with said inclined portions of said tongues to form a substantially frusto-conical stud-receiving opening slightly smaller in diameter than the diameter of the stud it is adapted to engage.

2. A fastener comprising a relatively thin plate of sheet material having an opening therein, a pair of diametrically opposed pairs of relatively flexible juxtaposed tongues with the free ends thereof bounding said opening, relatively rigid plate portions disposed on opposite sides of each pair of tongues and having a combined surface bounding said aperture greater than the combined bounding surface of said tongues, outwardly inclined portions adjacent the extreme free ends of said tongues, the remainder of said tongues normally lying substantially in the plane of said plate, and outwardly inclined portions on each of said relatively rigid plate portions cooperating with said inclined portions of said tongues to form a substantially frusto-conical stud-receiving opening slightly smaller in diameter than the diameter of the stud it is adapted to engage.

3. A fastener comprising a relatively thin plate of sheet material having an opening therein, a pair of diametrically opposed sets of relatively flexible juxtaposed tongues with the free ends thereof bounding said opening, said plate being of metal with the grain extending parallel to one dimension and said tongues extending generally with the grain of the metal, relatively rigid plate portions disposed on opposite sides of each set of tongues, outwardly inclined portions adjacent the extreme free ends of said tongues, the remainder of said tongues normally lying substantially in the plane of said plate, and outwardly inclined portions on each of said relatively rigid plate portions cooperating with said inclined portions of said tongues to form a substantially frusto-conical stud-receiving opening slightly smaller in diameter than the diameter of the stud it is adapted to engage.

HAROLD W. KOST.